United States Patent
Aoki et al.

(10) Patent No.: US 11,381,534 B2
(45) Date of Patent: Jul. 5, 2022

(54) COMMUNICATION SERVER DEVICE, COMMUNICATION CONTROL METHOD, AND PROGRAM

(71) Applicant: NIPPON TELEGRAPH AND TELEPHONE CORPORATION, Tokyo (JP)

(72) Inventors: Ryosuke Aoki, Musashino (JP); Yusuke Kameyama, Musashino (JP); Naoki Ohshima, Musashino (JP); Naoki Mukawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/973,746

(22) PCT Filed: Jun. 7, 2019

(86) PCT No.: PCT/JP2019/022722
§ 371 (c)(1),
(2) Date: Dec. 9, 2020

(87) PCT Pub. No.: WO2019/240036
PCT Pub. Date: Dec. 19, 2019

(65) Prior Publication Data
US 2021/0258273 A1    Aug. 19, 2021

(30) Foreign Application Priority Data
Jun. 13, 2018   (JP) .............................. JP2018-112697

(51) Int. Cl.
*G06F 3/01*    (2006.01)
*G10L 15/28*   (2013.01)
(Continued)

(52) U.S. Cl.
CPC .................................... *H04L 51/18* (2013.01)

(58) Field of Classification Search
CPC .................................. H04L 51/18; G06F 13/00
See application file for complete search history.

(56) References Cited

U.S. PATENT DOCUMENTS

| 8,200,753 | B2 * | 6/2012 | Chen ....................... H04L 51/04 370/522 |
| 9,602,450 | B1 * | 3/2017 | Kushnir .................. H04L 51/10 |

(Continued)

FOREIGN PATENT DOCUMENTS

JP    2011108052 A  *  6/2011

OTHER PUBLICATIONS

Shinya Kubota et al., Chat agents that activate communications between family members living apart by tweeting their sensed activities, IEICE Technical Report, Dec. 13, 2017.

(Continued)

*Primary Examiner* — Kevin T Bates
*Assistant Examiner* — Golam Mahmud (57) ABSTRACT

A communication server device that mediates communication information transmitted and received between a plurality of communication terminals provides people who are participating in a conversation using real-time chat with information that can create a trigger to prompt them to end the conversation. Included are a chat log update unit (13) that causes a chat log DB (15) to update and store communication information transmitted or received between a plurality of communication terminals in association with information of transmission or reception time; a conversation duration update unit (14) that causes a conversation duration DB (16) to update and store a duration from the time when the information is stored in the chat log DB (15); and an ongoing conversation determination unit (12) that (Continued)

presents, based on the duration stored in the conversation duration DB (16), interruption information related to the duration to the plurality of communication terminals in response to receiving a request to end transmission and reception of the communication information from at least one of the plurality of communication terminals.

5 Claims, 5 Drawing Sheets

(51) Int. Cl.
*B25J 9/16* (2006.01)
*H04L 51/18* (2022.01)

(56) References Cited

U.S. PATENT DOCUMENTS

| | | | | |
|---|---|---|---|---|
| 10,848,928 | B2* | 11/2020 | Rolland | H04L 65/4061 |
| 2009/0182826 | A1* | 7/2009 | Izumi | A63F 13/12 |
| | | | | 709/206 |
| 2010/0002685 | A1* | 1/2010 | Shaham | H04M 9/082 |
| | | | | 715/733 |
| 2015/0006655 | A1* | 1/2015 | Fradin | H04L 51/16 |
| | | | | 709/206 |
| 2018/0309801 | A1* | 10/2018 | Rathod | H04L 65/1069 |
| 2018/0367477 | A1* | 12/2018 | Hariram | H04L 65/1089 |
| 2020/0367071 | A1* | 11/2020 | Hashimoto | H04W 76/11 |

OTHER PUBLICATIONS

Atsurou Iwasa et al., Development of a Typing-Driven Embodied Entrainment Character Chat System with Immediate Display of Affective Expression, Human-Agent Interaction Symposium 2015, Dec. 5, 2014.

Yuusuke Kameyama et al., Proposal and Evaluation of Duration Time Notification Bot to Remove Motivational Differences Between Two Users for Continuation of Chat Communication, Human Communication Group Symposium 2017, Dec. 13, 2017.

Yuusuke Kameyama et al., Poster: Proposal and Evaluation of Duration Time Notification Bot to Remove Motivational Differences Between Two Users for Continuation of Chat Communication, Human Communication Group Symposium 2017, Dec. 13, 2017.

Yuusuke Kameyama et al., Presentation: Proposal and Evaluation of Duration Time Notification Bot to Remove Motivational Differences Between Two Users for Continuation of Chat Communication, Human Communication Group Symposium 2017, Dec. 13, 2017.

* cited by examiner

COMMUNICATION SERVER DEVICE, COMMUNICATION CONTROL METHOD, AND PROGRAM

CROSS-REFERENCE TO RELATED APPLICATIONS

This application is a 371 U.S. National Phase of International Application No. PCT/JP2019/022722, filed on Jun. 7, 2019, which claims priority to Japanese Application No. 2018-112697 filed on Jun. 13, 2018. The entire disclosures of the above applications are incorporated herein by reference.

TECHNICAL FIELD

The present invention relates to a communication server device, a communication control method, and a program.

BACKGROUND ART

As a communication tool, for example, chat using a mobile information terminal such as a smartphone has been widely used. Non-real-time chat for business, which has been particularly popular in recent years, is designed to expect a reply at any timing on the receiving side rather than to request a quick reply. Accordingly, even for a late reply to a chat, it is not necessary to express the reason and it is also not necessary to provide a clear announcement to terminate the conversation in a chat.

In contrast, real-time chat for consumers is designed to encourage communication in which real-time replies are expected, such as face-to-face conversations and telephone conversations, and thus in a situation that makes it difficult to reply quickly, it is necessary to end the conversation.

As described above, in real-time chat, there is the possibility that, in a situation that the chat is continued for a long time, a person who wants to continue the conversation as it is and a person who wants to end the conversation appear at the same time. In a conversation among people having such conflicting desires, a person who wants to end the conversation may hesitate to end the conversation because of being considerable of other people.

Incidentally, as assistive technologies for real-time chat, there are one for encouraging a chat conversation (NPL 1) and one for indicating affective expression of a user (NPL 2).

CITATION LIST

Non Patent Literature

[NPL 1] Shinya Kubota, Shuntaro Fukushima, Naoki Mukawa, Naoki Oshima, "Chat agents that activate communications between family members living apart by tweeting their sensed activities", IEICE, Human Communication Group Symposium 2017, HGC2017-B-4-6.
[NPL 2] Iwasa et al., "Development of a Typing-Driven Embodied Entertainment Character Chat System with Immediate Display of Affective of Expression", HAI Symposium 2015.

SUMMARY OF THE INVENTION

Technical Problem

As described above, as an assistive technology for real-time chat, there has been a long-felt need for a technology to prompt people who are participating in a conversation to end the conversation without any discomfort to anyone.

The present invention has been made in view of the above-mentioned circumstances, and an object of the present invention is to provide a communication server device, a communication control method, and a program capable of providing people who are participating in a conversation using real-time chat with information that can create a trigger to prompt them to end the conversation.

Means for Solving the Problem

One aspect of the present invention is a communication server device that mediates communication information transmitted and received between a plurality of communication terminals. The communication server device includes a first storage unit that updates and stores, in a first memory, communication information transmitted or received between the plurality of communication terminals in association with information indicating the transmission or reception time; a second storage unit that updates and stores, in a second memory, a duration since the communication information was stored in the first memory; and an information presentation control unit that presents, based on the duration updated and stored in the second memory, interruption information related to the duration to the plurality of communication terminals in response to receiving a request to end transmission and reception of the communication information from at least one of the plurality of communication terminals.

Effects of the Invention

According to the present invention, it is possible to provide people who are participating in a conversation using real-time chat with information that can create a trigger to prompt them to end the conversation.

DESCRIPTION OF EMBODIMENTS

Hereinafter, an embodiment in which the present invention is applied to a two-party chat system will be described in detail with reference to the drawings.

Figure 1:
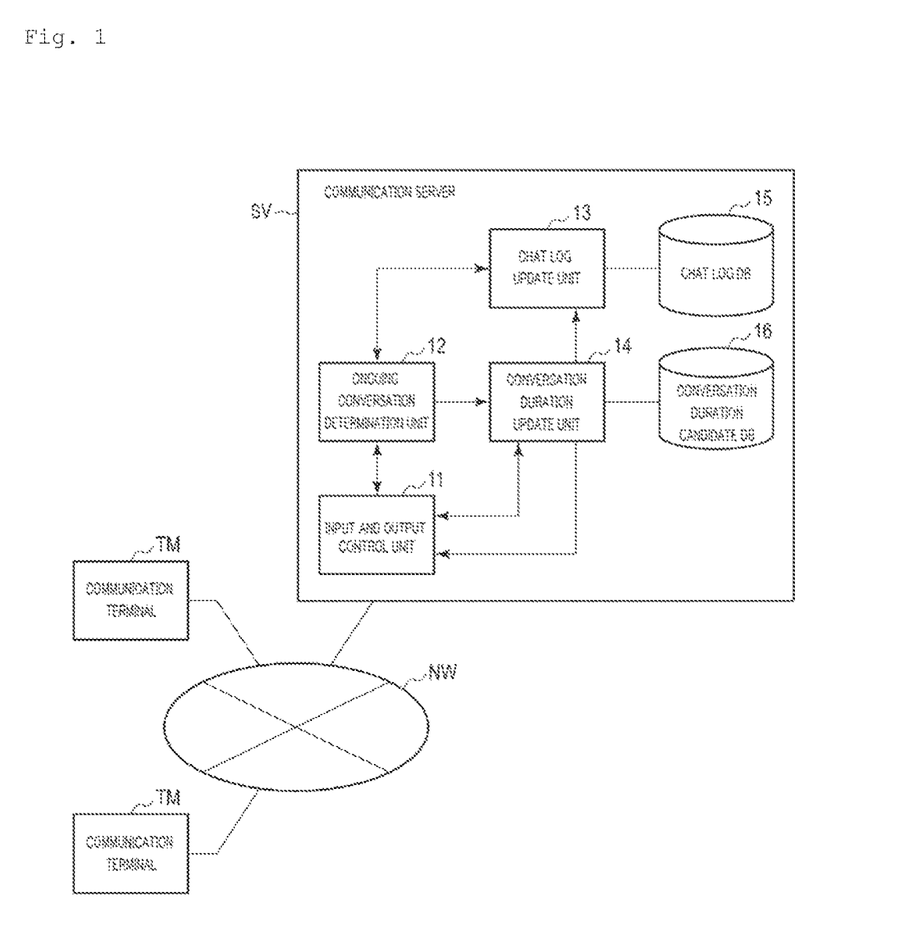
FIG. 1 is a diagram illustrating a configuration of the entire system according to an embodiment of the present invention.

FIG. 1 is a diagram illustrating a configuration of the entire system. In FIG. 1, communication terminals TM and TM respectively possessed by two chat users are connected to a communication server SV via a network NW.

The communication terminal TM is anyone of, for example, a smartphone, a future phone, and a tablet terminal, in which a chat application program is installed in advance. The network NW includes a base station and the Internet.

The communication server SV manages and controls the operation of chats, and includes an input and output control unit 11, an ongoing conversation determination unit 12, a chat log update unit 13, a conversation duration update unit 14, a chat log database (DB) 15, and a conversation duration database (DB) 16.

The input and output control unit 11 controls transmission and reception of various data between the network NW and each of the ongoing conversation determination unit 12, the chat log update unit 13, and the conversation duration update unit 14.

The ongoing conversation determination unit 12 uses the chat log update unit 13 and the conversation duration update unit 14 to determine whether a chat conversation is ongoing comprehensively.

Each time the chat log update unit 13 receives a conversation input on the chat, the chat log update unit 13 causes the chat log database 15 to store a log including the content of the conversation and time information at that time so that the log is updated.

Note that, for the content of the conversation updated and stored in the chat log database 15 by the chat log update unit 13, parsing of words and the like including syntactic parsing is performed as appropriate to recognize the content of the conversation at that time by classifying it into a conversation including a word frequently used based on daily habits and the like or a conversation including a word related to an unexpected event occurring and the like, so that the recognition result is also updated and stored.

The conversation duration update unit 14 updates and stores the conversation duration in the chat in the conversation duration database 16. The conversation duration update unit 14 also reads the conversation duration stored at that time from the conversation duration database 16 in response to a request from the ongoing conversation determination unit 12, and presents the read conversation duration to the ongoing conversation determination unit 12.

Here, the conversation duration to be updated and stored in the conversation duration database 16 includes, in addition to the duration from the time when the conversation in the chat started, the start time of an event including time information presented in the conversation, or the remaining time up to an event including time information presented in the conversation.

Next, the operation of the above embodiment will be described.

Figure 2:
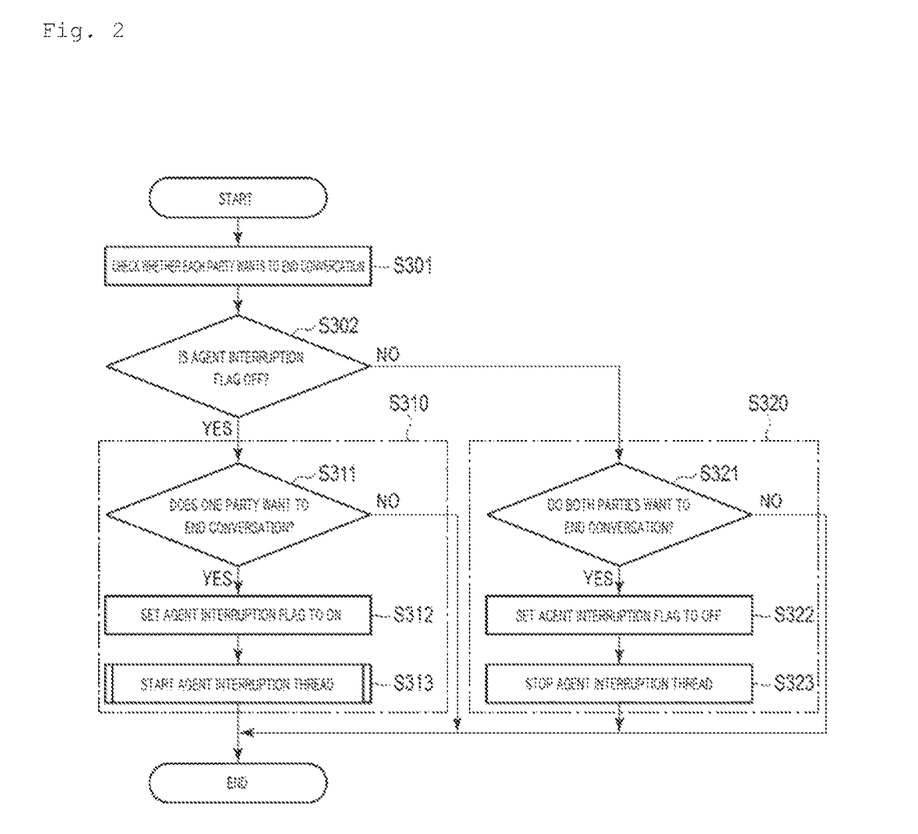
FIG. 2 is a flowchart illustrating processing of determining whether the conversation among parties is ongoing, according to the embodiment.

FIG. 2 is a flowchart illustrating the details of processing of determining whether a conversation among parties is ongoing, which is executed mainly by the ongoing conversation determination unit 12 as appropriate.

At the beginning of the processing, the ongoing conversation determination unit 12 sequentially searches the parties in the chat and checks whether or not someone indicates an intention to end the conversation (step S301).

The indication of the intention to end the conversation is determined based on, for example, a ratio between the number of character strings and the number of character stamps during the conversation, or whether or not the user touches the position of an operation button such as "I want to end the conversation" which is arranged to be displayed on one end of a display of the communication terminal TM.

Note that, for the operation button indicating the direct intention of the parties to end the conversation such as "I want to end the conversation", suppose that the fact the operation button has been operated is never recognized by the conversation partner.

Next, the ongoing conversation determination unit 12 determines whether or not an agent interruption flag of the chat is OFF at that time (step S302).

If it is determined that the agent interruption flag is OFF (YES in step S302), the ongoing conversation determination unit 12 next determines whether or not one of the parties wants to end the conversation (step S311).

If it is determined that one of the parties wants to end the conversation (YES in step S311), the ongoing conversation determination unit 12 newly sets the agent interruption flag to ON (step S312), also starts an agent interruption thread described later (step S313), and accordingly the processing in FIG. 2 ends.

The steps S311 to S313 are processing (step S310) when one user wants to end the chat.

Further, if it is determined in step S302 that the agent interruption flag is not OFF but ON (NO in step S302), the ongoing conversation determination unit 12 next determines whether or not both of the parties want to end the conversation (step S321).

If it is determined that both of the parties want to end the conversation (YES in step S321), the ongoing conversation determination unit 12 sets the agent interruption flag to OFF (step S322), also stops the agent interruption thread described later (step S323), and accordingly the processing in FIG. 2 ends.

The steps S321 to S323 are processing (step S320) when both users want to end the chat.

If it is determined in step S311 that none of the parties wants to end the conversation (NO in step S311) or if it is determined in step S321 that at least one of the parties does not want to end the conversation (NO in step S321), the ongoing conversation determination unit 12 does not perform the processing of changing settings and the others in steps S310 and S320, and accordingly the processing in FIG. 2 ends.

Note that, as described above, for the conversation duration handled by the ongoing conversation determination unit 12, the conversation is recognized by being classified into a conversation including a word frequently used continuously based on daily habits and the like or a conversation including a word related to an unexpected event occurring and the like.

The former conversation including a word frequently used can include, for example, a word related to the content used in a schedule book function of the communication terminal TM, and a word representing an event related to a matter extracted from a log of, for example, daily home appliance operation. Specific examples can include words related to meal times in daily life, wake-up times, bed times, start times of frequently watched TV programs, and the like.

The latter conversation including a word related to an unexpected event occurring can be, for example, about information including a change which is obtained through the Internet. Specific examples can include a word related to weather such as "It's getting sunny" in the middle of a chat, a word acquired from news information, and the like.

Next, the processing of the agent interruption thread executed by the ongoing conversation determination unit 12 will be described with reference to FIG. 3.

When the agent interruption thread is started, the interruption timing for chat is first determined (step S401).

Figure 4:
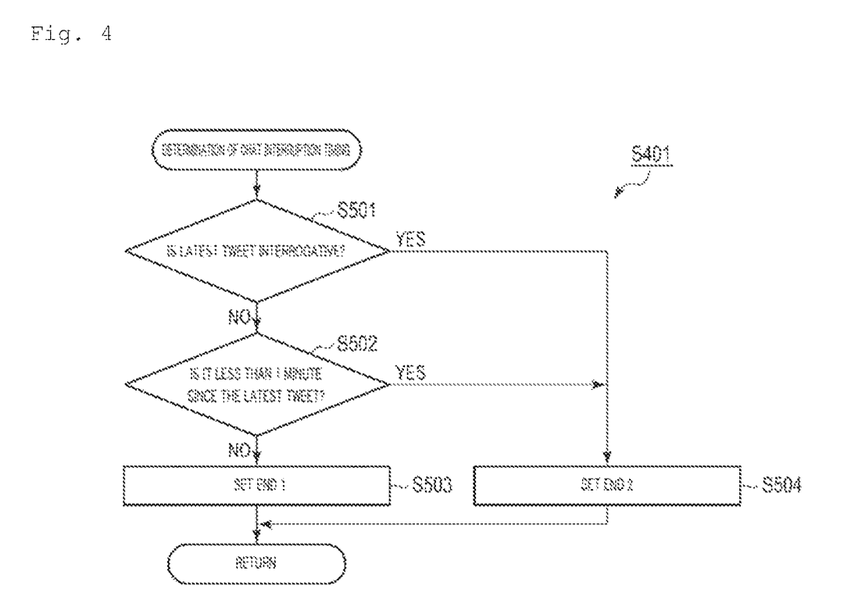
FIG. 4 is a flowchart illustrating subroutine processing of determining a chat interruption timing of FIG. 3 according to the embodiment.

FIG. 4 is a flowchart of a subroutine illustrating the details of the processing in step S401. Processing is executed such as syntactic parsing and the like of the character strings in the written content of the chat conversation stored in the chat log DB 15 to determine whether or not the latest tweet is in question form (step S501).

If it is determined that the latest tweet is interrogative (YES in step S501), the ongoing conversation determination unit 12 sets the chat interruption timing to "End 2" (step S504).

Further, if it is determined in step S501 that the latest tweet is not interrogative (NO in step S501), then the ongoing conversation determination unit 12 causes the chat log update unit 13 to search the stored contents in the chat log DB 15, and determines whether or not it is before a certain time has passed since the last tweet was made based on whether or not it is within 1 [minute] since the latest tweet in the conversation was made (step S502).

If it is determined that it is within 1 [minute] since the latest tweet in the conversation was made (YES in step S502), the ongoing conversation determination unit 12 sets the chat interruption timing to "End 2" (step S504).

Further, if it is determined in step S502 that 1 [minute] or more has passed since the latest tweet in the conversation was made (NO in step S502), the ongoing conversation determination unit 12 determines that the latest tweet is not interrogative and the certain time or more has elapsed since the latest tweet was made, and sets the chat interruption timing to "End 1" (step S503).

Figure 3:
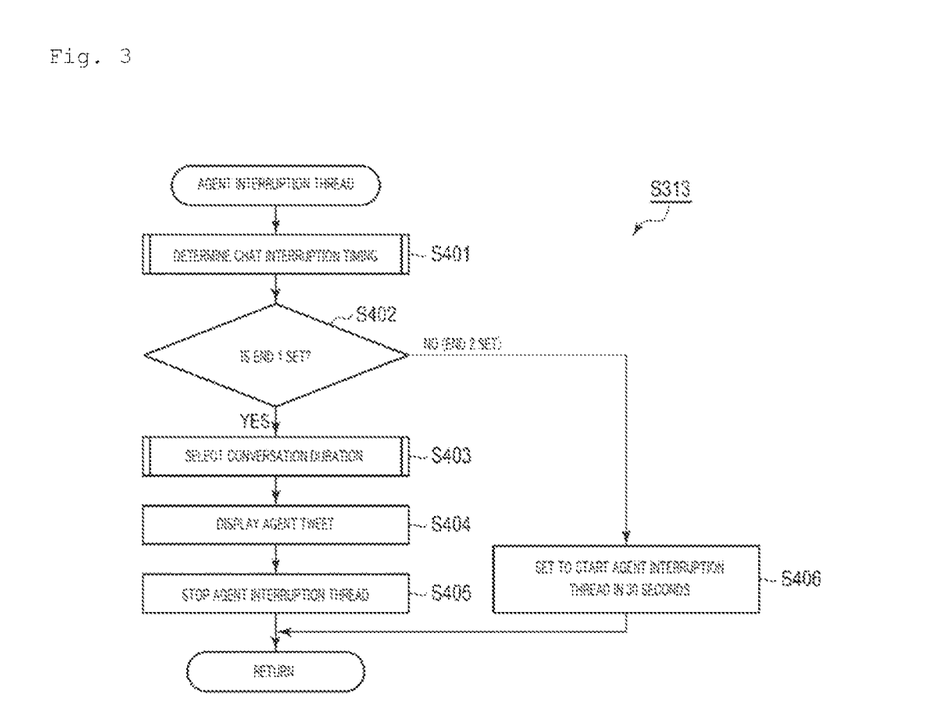
FIG. 3 is a flowchart illustrating subroutine processing of an agent interruption thread according to the embodiment.

The setting of "End 1" or "End 2" makes the subroutine of FIG. 4 end, and the processing returns to the processing of FIG. 3.

In FIG. 3, the ongoing conversation determination unit 12 determines whether or not the chat interruption timing is set to "End 1" (step S402).

Here, if it is determined that "End 2" is set instead of "End 1" (NO in step S402), the latest tweet is interrogative, or the certain time or more has not yet elapsed since the latest tweet was made, and thus the ongoing conversation determination unit 12 sets so that the agent interruption thread starts in 30 [seconds] from that point (step S406), and then the processing of FIG. 3 ends.

Further, if it is determined in step S402 that "End 1" is set (YES in step S402), the ongoing conversation determination unit 12 determines that the latest tweet is not interrogative and the certain time or more has elapsed since the latest tweet was made, and executes processing of selecting a duration of the conversation (step S403).

Figure 5:
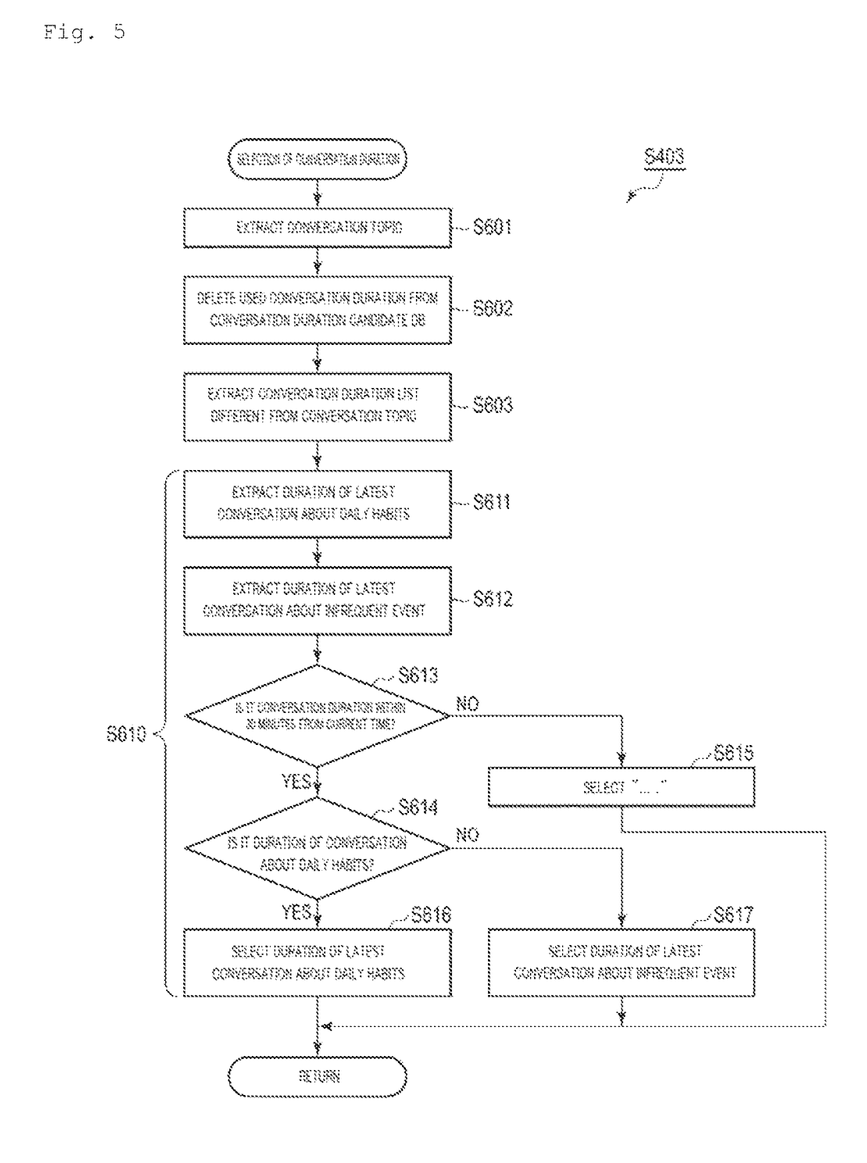
FIG. 5 is a flowchart illustrating subroutine processing of selecting a conversation duration of FIG. 3 according to the embodiment.

FIG. 5 is a flowchart of a subroutine illustrating the details of the processing in step S403. At the beginning of the processing, the ongoing conversation determination unit 12 causes the chat log update unit 13 to extract a word that is a topic of the conversation from the chat log database 15 (step S601).

Next, the ongoing conversation determination unit 12 causes the conversation duration update unit 14 to delete from the conversation duration database 16 the conversation duration used by the immediately preceding processing of FIG. 5 (step S602).

The ongoing conversation determination unit 12 creates a list of durations for extracting a conversation that can be about a topic different from the topic of the conversation within a latest time range, based on the result of deleting the used conversation duration(s) (step S603).

The ongoing conversation determination unit 12 first extracts, from the created list, the duration of the latest conversation including daily habits as a topic, by classifying it based on words (step S611).

On the other hand, the ongoing conversation determination unit 12 extracts, from the created list, the duration of the latest conversation about a topic of an unexpected event infrequently occurring, by classifying it based on words (step S612).

The ongoing conversation determination unit 12 determines, based on the extraction results, whether or not the duration of the latest topic that is closer to the current time is within 30 minutes from the current time (step S613).

If it is determined that the duration of the latest topic closer to the current time is more than 30 minutes from the current time (NO in step S613), the ongoing conversation determination unit 12 determines that the duration of each of the conversation about a topic of daily habits and the conversation about a topic of an unexpected event is more than the certain time, and selects " . . . ", which does not particularly indicate any content as a topic for which a conversation duration is to be presented by an agent (step S615).

Further, if it is determined in step S613 that the duration of the latest topic that is closer to the current time is within 30 minutes from the current time (YES in step S613), the ongoing conversation determination unit 12 then determines whether or not the duration of the latest topic that is closer to the current time is that of a conversation about a topic of daily habits (step S614).

If it is determined that the duration of the latest topic that is closer to the current time is for a conversation about a topic of daily habits (YES in step S614), the ongoing conversation determination unit 12 selects the duration of the latest conversation about daily habits, as a topic to be presented by an agent (step S616).

Further, it is determined in step S614 that the duration of the latest topic that is closer to the current time is not for a conversation about a topic of daily habits but a conversation including a word related to an unexpected event or the like (NO in step S614), the ongoing conversation determination unit 12 selects the duration of the conversation including a word relates to the latest unexpected event or the like, as a topic to be presented by an agent (step S617).

By the processing of S610 which is a combination of steps S611 to S617, the duration corresponding to the conversation about the latest topic that is closer to the current time is selected.

The ongoing conversation determination unit 12 selects the conversation duration by the processing of any of steps S615 to S617, and then temporarily ends the subroutine processing of FIG. 5, and the processing returns to the processing of FIG. 3.

In FIG. 3, the ongoing conversation determination unit 12 distributes a tweet by the agent using the selected conversation duration to both communication terminals TM and TM so that the tweet is displayed there (step S404).

Specific tweets to be delivered include, as the content based on words in the conversation stored in the chat log database 15, for example, " . . . " in step S615, "10 minutes have passed since the start of the TV program X-TEN" in step S616, and "20 minutes left until the special sale of the latest robot cleaner XXX ends" in step S617.

After the delivery of the tweet is completed, the ongoing conversation determination unit 12 sets the stop of the agent interrupt thread (step S405), and accordingly the processing of FIG. 3 ends.

In the present embodiment as described above, the conversation is classified, based on words having been used in actual conversational communication in chats, into a topic of a frequent event such as daily habits or a topic of a highly-unexpected, infrequent event, and then a selected agent's tweet is delivered.

As described in detail above, according to the present embodiment, an agent's tweet about a conversation duration is presented, as interruption information, to people who are participating in a conversation using real-time chat. Accordingly, the people who are participating in the conversation is presented with information that can create a trigger to prompt them to end the conversation from the agent. As a result, a person who wants to end the conversation can end the conversation based on the presented information without giving an unnatural impression to other people.

Further, in the above-described embodiment, the content of communication information is classified into a plurality of types in such a manner that the conversation is classified, based on words having been used in actual conversational communication in chats, into a topic of a frequent event such as daily habits or a topic of a highly-unexpected, infrequent event, and based on the classification result and the duration, communication information is presented from an appropriate server side. Accordingly, it is possible to prompt participants of the corresponding communication service to end the communication by using information that is suitable and comfortable to them.

Furthermore, in the above-described embodiment, when it is determined that the degree of appeal to the communication between the participants is high, for example, in a case where the latest communication is interrogative, or a case where the interruption time after the last communication is extremely short, switching between presentation and no presentation of the duration based on the determination result makes it possible to maintain the operation of the communication service without prompting to end the communication in an unnatural manner.

Note that, the above embodiment describes a case where the present invention is applied to a communication system for performing a two-party chat for the sake of simplicity of description, but the present invention is not limited to such a system. The present invention can be similarly applied to, for example, chats by three or more parties, teleconferences and video conferences between multiple speakers, and systems for performing communication using virtual avatars.

In addition, the present invention is not limited to the above-described embodiment, and various modifications are possible in practical applications without departing from the scope and spirit of the present invention. Further, the respective embodiments may be combined to implement as appropriate as much as possible, in which case the combined effects can be obtained. Furthermore, the above-described embodiments include inventions at various stages, and various inventions can be extracted by appropriately combining a plurality of disclosed constituent elements.

REFERENCE SIGNS LIST

11 Input and output control unit
12 Ongoing conversation determination unit
13 Chat log update unit
14 Conversation duration update unit
15 Chat log database (DB)
16 Conversation duration database (DB)
NW Network
SV Communication server
TM Communication terminal

The invention claimed is:

1. A communication server device that mediates real-time chat information transmitted and received between a plurality of communication terminals, the communication server device comprising:

a first storage unit that updates and stores, in a first memory, communication information transmitted or received between the plurality of communication terminals in association with information indicating the transmission or reception time during the real-time chat;
a second storage unit that updates and stores, in a second memory, a duration since the communication information of the real-time chat was stored in the first memory;
a processor; and
a storage medium having computer program instructions stored thereon, when executed by the processor, perform to present, based on the duration updated and stored in the second memory, interruption information regarding intention to end the real-time chat to the plurality of communication terminals in response to receiving a request to end the real-time chat from at least one of the plurality of communication terminals,
wherein the request to end the real-time chat is determined based on a ratio between a number of character strings and a number of character stamps during the real-time chat.

2. The communication server device according to claim 1, wherein the computer program instructions further perform to classify the communication information stored in the first memory into a plurality of types, wherein the information presentation control unit presents, for each of the plurality of types classified by the classification unit, interruption information related to the duration.

3. The communication server device according to claim 1, wherein the computer program instructions further perform to determine a degree of appeal to the communication information stored in the first memory between the communication terminals, wherein the information presentation control unit switches between presentation and no presentation of interruption information related to the duration, based on a result of determining the degree of appeal by the determination unit.

4. A communication control method executed by a plurality of communication terminals and a communication server device that mediates real-time chat information transmitted and received between the communication terminals, the communication control method comprising: a first storage step of updating and storing, in a first memory, communication information transmitted or received between the plurality of communication terminals in association with information indicating the transmission or reception time during the real-time chat; a second storage step of updating and storing, in a second memory, a duration since the communication information was stored in the first memory; an information presentation control step of presenting, based on the duration updated and stored in the second memory, interruption information regarding intention to end the real-time chat to the plurality of communication terminals in response to receiving a request to end the real-time chat from at least one of the plurality of communication terminals, wherein the request to end the real-time chat is determined based on a ratio between a number of character strings and a number of character stamps of the real-time chat.

5. A non-transitory computer-readable medium having computer-executable instructions that, upon execution of the instructions by a processor of a computer, cause the computer to function as the communication server device of claim 1.

* * * * *